(12) United States Patent
Yu et al.

(10) Patent No.: US 8,584,780 B2
(45) Date of Patent: Nov. 19, 2013

(54) DEVICE FOR COOLING THE BATTERIES OF AN ESPECIALLY ELECTRIC VEHICLE AND VEHICLE COMPRISING SUCH A DEVICE

(75) Inventors: Robert Yu, Montigny le Bretonneux (FR); Flavien Dubief, Neuchatel (CH); Masato Origuchi, Rambouillet (FR)

(73) Assignee: RENAULT s.a.s, Boulogne-Billancourt (FR)

( * ) Notice: Subject to any disclaimer, the term of this patent is extended or adjusted under 35 U.S.C. 154(b) by 94 days.

(21) Appl. No.: 13/142,927

(22) PCT Filed: Dec. 7, 2009

(86) PCT No.: PCT/FR2009/052428
§ 371 (c)(1),
(2), (4) Date: Nov. 15, 2011

(87) PCT Pub. No.: WO2010/076454
PCT Pub. Date: Jul. 8, 2010

(65) Prior Publication Data
US 2012/0048505 A1    Mar. 1, 2012

(30) Foreign Application Priority Data

Dec. 30, 2008 (FR) ...................................... 08 59125

(51) Int. Cl.
*B60R 16/04* (2006.01)
(52) U.S. Cl.
USPC ........................................ 180/68.5; 180/68.2
(58) Field of Classification Search
USPC ............... 180/68.1, 68.2, 68.5; 903/907, 952; 165/41, 42, 43
See application file for complete search history.

(56) References Cited

U.S. PATENT DOCUMENTS

| | | | |
|---|---|---|---|
| 5,490,572 A * | 2/1996 | Tajiri et al. | 180/65.1 |
| 7,900,727 B2 * | 3/2011 | Shinmura | 180/68.1 |
| 7,997,367 B2 * | 8/2011 | Nakamura | 180/68.5 |
| 2003/0226653 A1 | 12/2003 | Takedomi et al. | |
| 2006/0080986 A1 * | 4/2006 | Inoue | 62/259.2 |
| 2007/0089442 A1 | 4/2007 | Tsuchiya | |
| 2009/0133859 A1 | 5/2009 | Suzuki et al. | |

FOREIGN PATENT DOCUMENTS

| WO | 2005 092650 | 10/2005 |
|---|---|---|
| WO | 2007 111209 | 10/2007 |

OTHER PUBLICATIONS

International Search Report issued Feb. 26, 2010 in PCT/FR09/052428 filed Dec. 7, 2009.

* cited by examiner

*Primary Examiner* — John Walters
(74) *Attorney, Agent, or Firm* — Oblon, Spivak, McClelland, Maier & Neustadt, L.L.P.

(57) ABSTRACT

A device for cooling a battery or batteries of a motor vehicle, for example an electric vehicle, includes a temperature regulating unit including an evaporator that is used to cool the passenger compartment of the vehicle and arranged in a housing, the battery or batteries being contained in a case. The housing of the evaporator is connected to a conduit, an outlet of which is oriented towards a heat exchange area on at least one outer surface of the case containing the battery or batteries.

9 Claims, 1 Drawing Sheet

DEVICE FOR COOLING THE BATTERIES OF AN ESPECIALLY ELECTRIC VEHICLE AND VEHICLE COMPRISING SUCH A DEVICE

BACKGROUND

The present invention relates to a device for cooling the battery or batteries of notably an electric motor vehicle, of the hybrid or all-electric type.

Vehicles with an electric motor are fed with electric power by a battery the life of which is crucial considering its initial price.

These electrochemical batteries, very sensitive to temperature variations, are usually designed to operate optimally in a temperature range of 20 to 40° C., or even of 20 to 30° C.

A temperature higher than 40° C. makes it possible to improve the performance of a lithium battery but increases its speed of deterioration, a temperature of 40° C. already being high for ensuring a long life.

A temperature higher than 40° C. for a battery of the NiMH (or NiCd) type affects the charging capacity of the battery and accelerates its rise in temperature.

Because of their relatively large size and weight (typically 15 to 20 kWh for a battery of 150 to 200 kg providing a range of 100 to 150 km), these batteries increase in temperature slowly but are difficult to cool.

Since the generation of heat is proportional to the square of the electric current and the power is proportional to the current, the generation of heat is proportional to the square of the power.

A very rapid charge of the battery (in approximately fifteen minutes) can therefore cause a generation of very great heat in the battery.

In the case of a system for rapidly charging the battery, the driver may use the vehicle several times in the same day by rapidly charging the battery after it has been completely discharged following the use of the vehicle.

In this case, the temperature of the battery will increase more and more until it reaches the maximum authorized temperature, the battery not having the time to cool between two rapid charging cycles of the battery.

It is then necessary to cool the battery in order to protect its life.

The document U.S. Pat. No. 5,834,132 proposes a system for regulating the temperature of a battery of a motor vehicle.

This system proposes a cooling circuit traveling between the cells of the battery, this circuit being supplied with cooling fluid by a reservoir.

A pump is necessary for circulating the cooling fluid.

The fluid is cooled by the outside air by means of a radiator and an associated fan.

However, in order to ensure an effective cooling, the dimensions of the radiator and the capacity of the fan must be considerable, the temperature differences between the outside air and the fluid and between the battery and the fluid being relatively small.

The result of this is a relatively large bulk and weight of such a system, which moreover is complex and costly because of the cooling circuit, the pump, the radiator and the ventilator, which are large in size, and because of the necessary valves.

Moreover, such a system is not sufficiently effective to cool the battery in the case of successive rapid charges because of the generation of very considerable heat in a very short time.

Another known cooling device uses the air-conditioning system of the vehicle to cool the battery or batteries.

This device is fitted to the vehicles of the Ford Escape type and is shown diagrammatically in FIG. 1.

This device comprises an evaporator 1 situated in the passenger compartment 2 which is connected to the condenser 3 situated outside the passenger compartment by two ducts 4, 5 in which a coolant, such as Freon, that is compressed in a compressor 6, flows.

The two ducts 4, 5 are connected to two branch ducts 7, 8 that are connected to an evaporator 9 which cools the inside of a casing 10 enclosing the batteries 11.

The holders 12, 13 make it possible to regulate the flow of the coolant in the ducts 4, 5 and 7, 8.

The drawback of this cooling device lies in the fact that the evaporator 9 is situated in the casing 10 which encloses the batteries, which increases the volume of this casing 10 and complicates the connection between the evaporator 9 and the branch circuit of the coolant, which poses problems when it is desired to remove the casing 10 from the vehicle.

BRIEF SUMMARY

The object of the present invention is to remedy these drawbacks.

This object is achieved, according to the invention, by virtue of a device for cooling the battery or batteries of a motor vehicle, in particular of an electric vehicle, comprising an air conditioner of which the evaporator is suitable for cooling the passenger compartment of the vehicle and is contained in an enclosure, the battery or batteries being situated in a casing, this device being characterized in that the enclosure of the evaporator is connected to a duct the outlet of which is directed toward a heat-exchange zone provided on at least one outer face of the casing containing the battery or batteries.

Thus, a portion of the cold air produced by the evaporator is drawn off from the enclosure enclosing the latter and is sent via the duct to the heat-exchange zone provided on at least one face of the casing, which makes it possible to cool the battery or batteries.

Because of this, the casing does not comprise a second evaporator, which makes it possible to simplify the manufacture of this casing.

In a preferred version of the invention, said heat-exchange zone comprises a portion external to said casing placed facing the outlet of said duct and a portion placed facing the inside of said casing.

According to a particularly advantageous embodiment of the invention, said heat-exchange zone consists of a radiator comprising a metal base having on one of its faces a first series of fins directed toward the outlet of said duct and on its opposite face a second series of fins directed toward the inside of said casing.

Thus, the first series of fins makes it possible to cool the radiator by the cold air leaving the duct and the second series of fins makes it possible in its turn to cool the air contained in the casing, which makes it possible to effectively cool the battery or batteries.

In this embodiment, said radiator is connected in a sealed manner to an outer wall of said casing situated facing the outlet of said duct.

The heat exchange between the fins of the radiator and the battery or batteries can be achieved by natural air convection or by forced convection by means of a fan.

This heat exchange may also be achieved by conduction by means of a metal structure or heat pipes.

In an enhanced version of the device according to the invention, at least one of the outer walls of the casing containing the battery or batteries comprises at least one flap that can be opened in order to place the inside of the casing in communication with the ambient air.

Thus, when the ambient air is cold, said flap can be opened to cool the inside of the casing by means of the outside cold air, which makes it possible to switch off the air conditioning of the vehicle and thus to achieve an energy saving.

According to another aspect, the invention also relates to a motor vehicle, notably electric, comprising a cooling device according to the invention.

In a preferred version of this vehicle, the casing containing the battery or batteries is attached in a removable manner in this vehicle, which presents no problems because the casing does not enclose an evaporator and the radiator (or said heat-exchange zone) is physically free from the rest of the air-conditioning device.

Other particular features and advantages of the invention will also appear throughout the following description.

BRIEF DESCRIPTION OF THE DRAWINGS

In the appended drawings, given as nonlimiting examples.

DETAILED DESCRIPTION

Figure 1:
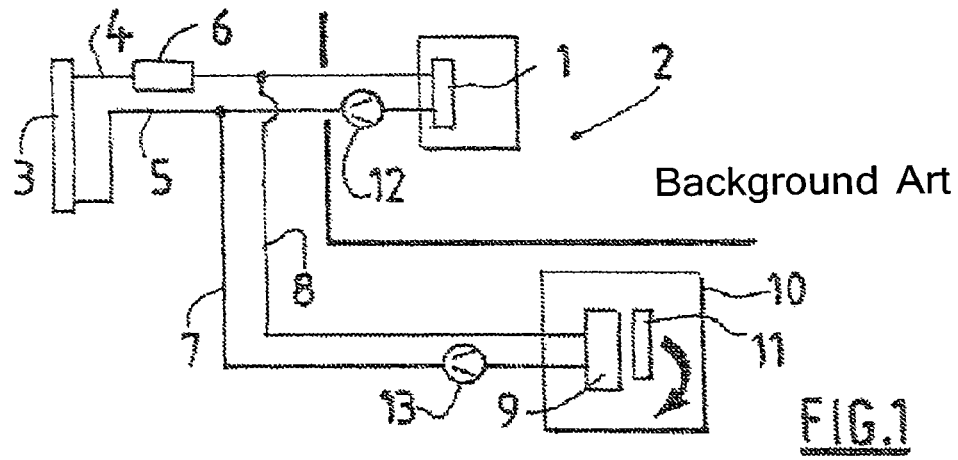
FIG. 1 is a diagram of a known cooling device.
Figure 2:
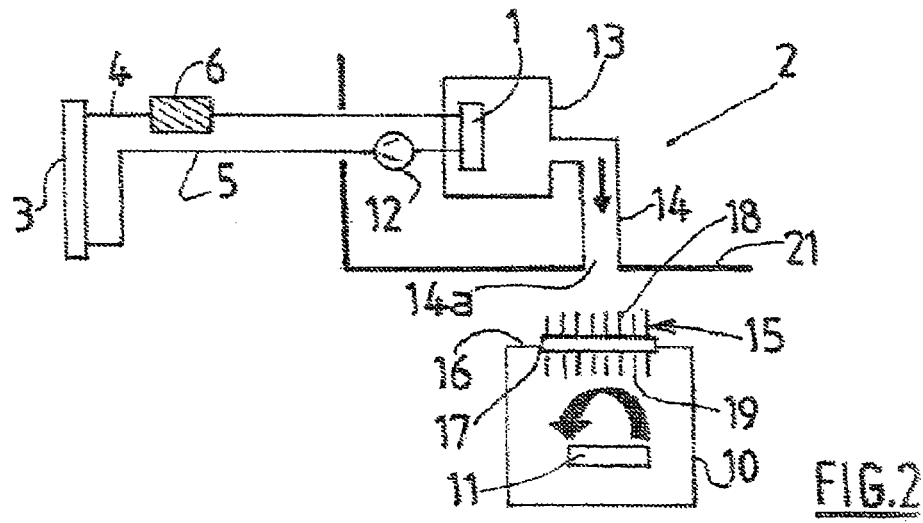
FIG. 2 is a diagram of a cooling device according to the invention.
Figure 3:
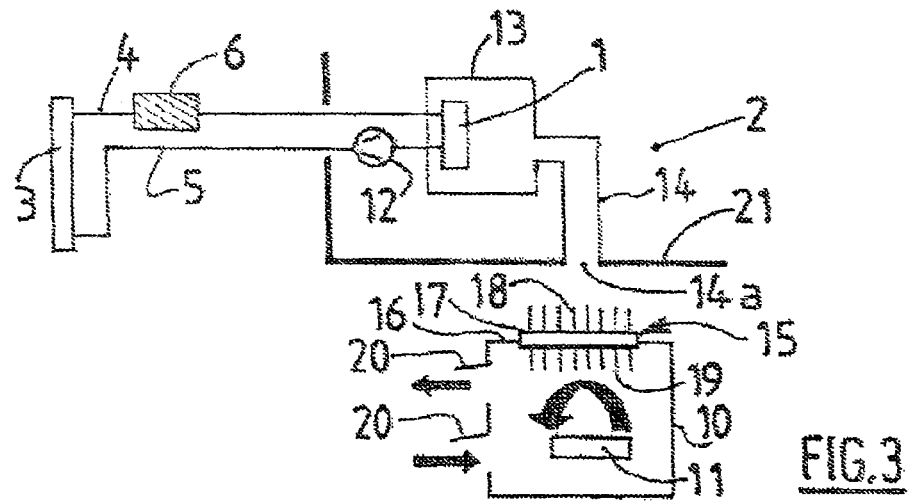
FIG. 3 is a diagram of an enhanced cooling device.

In the diagrams of FIGS. 2 and 3, the elements that are identical to those of the known cooling device of FIG. 1 bear the same reference numbers.

Accordingly, the elements that are common between FIGS. 2, 3 and 1 will not be described again.

In the embodiment shown in FIGS. 2 and 3, the device for cooling the battery or batteries 11 of a motor vehicle, in particular of an electric vehicle, comprises an air conditioner the evaporator 1 of which is suitable for cooling the passenger compartment 2 of the vehicle and is contained in an enclosure 13.

This enclosure 13 comprises an outlet (not shown) for diffusing the cold air into the passenger compartment 2.

According to the invention, the enclosure 13 of the evaporator 1 is connected to a duct 14 the outlet 14a of which is directed toward a heat-exchange zone 15 provided on an outer face 16 of the casing containing the battery 11.

This heat-exchange zone 15 comprises a portion outside the casing 10 and placed facing the outlet 14a of the duct 14 and an inside portion placed facing the inside of the casing 10.

In the example shown in FIGS. 2 and 3, the heat-exchange zone 15 consists of a radiator comprising a metal base 17 having on one of its faces a first series of fins 18 directed toward the outlet 14a of the duct 14 and on the opposite face a second series of fins 19 directed toward the inside of the casing 10.

The radiator 15 is connected in a sealed manner to an outer wall of the casing 10 situated facing the outlet 14a of the duct 14.

The heat exchange between the fins 19 of the radiator and the battery 11 can be achieved by natural convection or forced convection by means of a fan.

This heat exchange may also be achieved by conduction between the fins 19 of the radiator 15 and the battery 11 by means of a metal structure or heat pipes.

In the version shown in FIG. 3, one of the outer walls of the casing 10 containing the battery 11 comprises flaps 20 that can be opened in order to place the inside of the casing 10 in communication with the ambient air, when the outside temperature is low enough to cool the battery 11.

The casing 10 containing the battery 11 is attached in a removable manner, for example beneath the floor 21 of the vehicle substantially at the vertical of the enclosure 13 of the air conditioner so that the duct 14 is as short as possible.

The removable attachment of the casing 10 poses no particular problem because there is no physical link between the casing 10 and the rest of the air conditioner, unlike the case of the prior art shown in FIG. 1.

The operation of the cooling device according to the invention will now be explained with reference to FIG. 3.

When the holder 12 of the circuit 4, 5 is operating, the coolant, such as Freon, flows in the evaporator 1, which has the effect of cooling the passenger compartment 2 and of sending cool air into the duct 14.

The cool air leaving the outlet 14a of this duct cools the fins 18 of the radiator 15 and the fins 19 of the latter cool the air contained in the casing 10 which, by natural convection or forced convection by means of a fan, cools the battery 11.

The cooling device thus makes it possible to prevent the temperature of the batteries from exceeding a temperature of the order of 40° C., while making it possible to cool the passenger compartment 2 when the vehicle is traveling.

When the vehicle is stationary, the device also makes it possible to effectively cool the batteries 11 during a cycle for rapidly recharging the latter.

In this case, it is sufficient to run the motor of the vehicle in order to drive the compressor 6 and to close the outlet of the enclosure 13 in order to prevent unnecessarily cooling the passenger compartment 2.

When the ambient temperature is low enough, it is possible to open the flaps 20 of the casing 10 and switch off the air conditioning of the vehicle.

In this case, specifically, the outside air is sufficiently cold to cool the air inside the casing 10 and the battery 11 situated inside the latter.

The invention claimed is:

1. A device for cooling a battery or batteries of a motor vehicle, or of an electric vehicle, comprising:
    an air conditioner of which an evaporator is configured to cool a passenger compartment of the vehicle and is contained in an enclosure, the battery or batteries being situated in a casing,
    wherein the enclosure of the evaporator is connected to a duct including an outlet that is directed toward a heat-exchange zone provided on at least one outer face of the casing containing the battery or batteries, and
    wherein the heat-exchange zone comprises a radiator comprising a metal base including on an external face a first series of fins extending outside of the casing and directed toward the outlet of the duct and on an internal face a second series of fins directed toward an inside of the casing.

2. The device as claimed in claim 1, wherein the radiator is connected in a sealed manner to an outer wall of the casing situated facing the outlet of the duct.

3. The device as claimed in claim 1, further comprising means for heat exchange by convection between the fins of the radiator and the battery or batteries.

4. The device as claimed in claim 1, further comprising means for heat exchange by conduction between the fins of the radiator and the battery or batteries, the means comprising a metal structure or heat pipes.

5. A motor vehicle, or an electric vehicle, comprising a cooling device as claimed in claim 1.

6. The motor vehicle as claimed in claim 5, wherein the casing containing the battery or batteries is attached in a removable manner in the vehicle.

7. The device as claimed in claim 1, wherein the casing does not comprise an evaporator.

8. The motor vehicle as claimed in claim 5, wherein the casing does not comprise an evaporator.

9. A device for cooling a battery or batteries of a motor vehicle, or of an electric vehicle, comprising:
- an air conditioner of which an evaporator is configured to cool a passenger compartment of the vehicle and is contained in an enclosure, the battery or batteries being situated in a casing,
- wherein the enclosure of the evaporator is connected to a duct including an outlet that is directed toward a heat-exchange zone provided on at least one outer face of the casing containing the battery or batteries, and
- wherein at least one of outer walls of the casing containing the battery or batteries comprises at least one flap configured to be opened to place an inside of the casing in communication with ambient air.

* * * * *